United States Patent [19] [11] 3,879,372
Boesten [45] Apr. 22, 1975

[54] PREPARATION OF ASPARTYL DIPEPTIDE-ALKYLESTERS USING AQUEOUS SOLVENT

[75] Inventor: Wilhelmus H. J. Boesten, Sittard, Netherlands

[73] Assignee: Stamicarbon, B.V., Heerlen, Netherlands

[22] Filed: Nov. 15, 1972

[21] Appl. No.: 306,524

[30] Foreign Application Priority Data
Nov. 19, 1971 Netherlands............... 7115944

[52] U.S. Cl. ............................................ 260/112.5
[51] Int. Cl. ................. C07c 103/52; A23l 1/26
[58] Field of Search .................................. 260/112.5

[56] References Cited
UNITED STATES PATENTS
3,769,333  10/1973  Lapidus et al. ............... 260/112.5
FOREIGN PATENTS OR APPLICATIONS
2,040,473  1/1971  France ............................ 260/112.5
2,107,411  8/1971  Germany ........................ 260/112.5

Primary Examiner—Lewis Gotts
Assistant Examiner—Reginald J. Suyat
Attorney, Agent, or Firm—Cushman, Darby & Cushman

[57]  ABSTRACT

A process for preparing aspartyl α-amino acid lower alkyl esters is disclosed, wherein an N-protected aspartic acid anhdyride is reacted with an α-amino acid lower alkyl ester at a temperature of about −10 to +50 °C, and at a pH of 4–12, in an aqueous solvent. After the reaction, the N-protective group is removed to produce the desired aspartyl α-amino acid lower alkyl ester which has a peptide linkage.

Many of the products produced by the present invention are useful as sweetening agents, as well as starting materials in the synthesis of polypeptides, e.g. gastrine.

16 Claims, No Drawings

PREPARATION OF ASPARTYL DIPEPTIDE-ALKYLESTERS USING AQUEOUS SOLVENT

BACKGROUND OF THE INVENTION

French Pat. No. 2,040,473 disclosed that α-L-aspartyl-L-phenylalanine alkyl esters can be prepared by reacting N-protected-L-aspartic acid anhydride with a lower alkyl ester of L-phenylalanine in a dry organic solvent.

Copending application, Ser. No. 144,639, filed May 18, 1971, now U.S. Pat. No. 3,808,190, and assigned to a common assignee (corresponding to published Netherlands patent application 7,007,176) disclosed the preparation of dipeptide alkyl esters by conducting the synthesis reaction in a mixture of an organic solvent and water, wherein the volume ratio of water:organic solvent must be less than 0.5:1, preferably with a volume ratio of less than 0.1:1.

In the synthesis of dipeptide material based upon asparagyl compounds, it is generally desired, especially in instances where the dipeptides are to be used as sweetening agents, to prepare the α-isomer, and the art has generally attempted to avoid formation of the β-isomer as much as possible as the β-isomer has no sweetening effect. Furthermore, the pharmacological properties of the β-isomer have not been completely determined.

SUMMARY OF THE INVENTION

It has been found that high coupling efficiencies or linkage efficiencies can be obtained, with increased α-isomer selectively, if the asparagyl amino acid alkyl esters are prepared by reacting N-protected aspartic acid anhydride and an α-isomer acid alkyl ester in a solvent which consists essentially of water, and then removing the N-protecting group from the resulting reaction product.

DESCRIPTION OF THE INVENTION

Asparagyl amino acid alkyl esters are prepared by reacting a N-protected aspartic acid anhydride with an amino acid $C_1-C_5$ alkyl ester, and thereafter removing the N-protective group from the reaction product to produce the asparagyl amino acid lower alkyl ester having a peptide linkage. The reaction between the anhydride and the amino acid ester is conducted in a solvent reaction medium which is water, which may contain minor amounts of inert organic solvents, if desired. The reaction is at a temperature of −10 to +50°C, and a pH of 4–12. In the process of the present invention, high linkage efficiencies, on the order of greater than 95 percent, are achieved, while high α-isomer selectivity, on the order of about 90 percent, may be observed. The process preferably involves the synthesis of L-α-aspartyl-L-phenylalanine methyl ester, which is an important sweetening agent which can be prepared from relatively cheap raw materials.

When water is used as the reaction solvent, it has unexpectedly been found that the hydrolysis of the anhydride group is much slower than the aminolysis of the asparatic acid anydride. Furthermore, the use of water as a solvent results in a considerable cost advantage, as compared to other reaction solvents. In addition, with the use of an aqueous solvent, no expensive additional materials, such as, for instance, triethylamine or other tertiary bases, need be used. The process may be readily conducted in a continuous as well as a discontinuous manner. As indicated, some organic solvent may be present in the reaction solvent, e.g., up to 10 percent or even 20 percent by volume, if desired, although the best results are obtained when the only solvent is water.

Generally, the amino acid lower alkyl ester has the formula

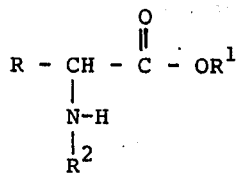

wherein R is alkyl of 1–5 carbon atoms, possibly substituted by one or more hydroxy, mercapto, $C_1-C_5$ alkoxy, $C_1-C_5$ alkylthio, cyclopentyl, cyclohexyl, phenyl, hydroxyphenyl or $C_1-C_5$ alkoxyphenyl groups, the radical

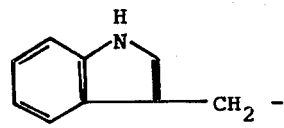

the radical

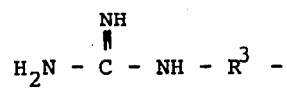

the radical

the radical

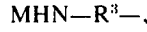

wherein M is a N-protective group, the radical

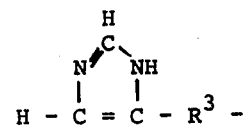

wherein $R^1$ is lower alkyl of 1–5 carbon atoms, $R^2$ is hydrogen or taken together with R, is a lower alkylene radical of 4 to 6 carbon atoms, which may be hydroxy substituted, $R^3$ is lower alkylene of 1–4 carbon atoms, and $R^4$ is $C_1$ to $C_6$ alkyl or a carbocyclic radical with 5 or 6 carbon atoms in the ring.

The α-amino acid alkyl ester may be based upon a wide variety of amino acids, including alanine, valine, leucine, proline, tryptophane, lysine, arginine, methionine, phenylalanine, trysoine, methoxytyrosine, phenylglycine, hexadhydrophenylalanine, hexahydrophenylglycine, aspartic acid and glutamic acid. The esters may be used as such or in the form of salts thereof. As known to the art, the α-aspartyl derivatives of lower alkyl esters of the latter 8 of the above amino acids are sweetening agents. When the product produced by the process of the present invention is to be used as a sweetening agent, it is preferred to start from a salt of a lower alkyl ester of a L-amino acid, wherein the alkyl group contains at most 5 carbon atoms, preferably 1 carbon atom, and from a L-N-protected-aspartic acid anhydride. The amino acid ester salts may be derived from a wide variety of different acids, preferably inorganic acids such as hydrochloric acid, sulphuric acid, phosphoric acid and hydrobromic acid. More preferably, however, the salt is derived from readily available hydrochloric acid. It will be appreciated by those in the art that other material and synthetic amino acids may be used in the process of the present invention, in place of the amino acids listed above.

Generally, the amino acid alkyl ester is used in an equimolecular amount based on the amount of the aspartic acid anhydride, although, it will be readily appreicated that greater and lesser amounts of the amino acid alkyl esters can be used; however, in such cases, higher synthesis costs are generally involved.

The aspartic acid anhydride has the amino group thereof protected, using a conventional N-protective agent. Any of the conventional N-protective agents known to the art may be utilized, for instance, those agents disclosed by Fieser and Fieser, *Reagents for Organic Synthesis*, 1967, John Wiley & Sons, New York, the disclosure of which is hereby incorporated by reference, may be used. Preferably, however, the N-protected aspartic acid anhydride is of the formula

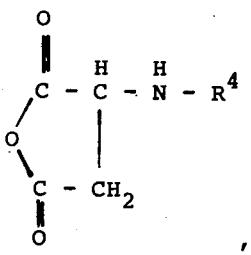

wherein $R^4$ is

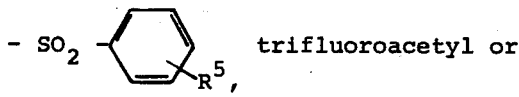 trifluoroacetyl or

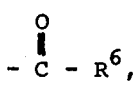

wherein $R^5$ is a lower alkyl radical of 1–4 carbon atoms, wherein 1 or more hydrogen atoms may be substituted by halogen, and $R^6$ is hydrogen, $R^5$, benzhydryl,

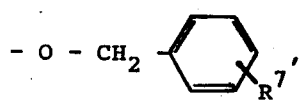

or $OR^5$,
wherein $R^7$ is $R^5$, $-OR^5$, hydrogen, or nitro.
More preferably, the protective group is the formyl group, the benzyloxycarbonyl (carbobenzoxy) group, the t-butyloxycarbonyl group, the t-amyloxycarbonyl group, the paramethoxybenzyloxycarbonyl group, or the trifluoro acetyl group, and the formyl group is most preferred, as a higher α-isomer yield can thereby be realized. The formyl group is acid unstable and can be readily separated from the amino radical by acidulation, for instance, to a pH of 1. On the other hand, for instance, the carbobenzoxy protective group is removed from the amino group by hydrogenation, using a conventional hydrogenation catalyst, such as palladium supported on an activated carbon carrier, at a temperature of preferably about 0° to 50°C. The hydrogenation catalysts and conditions set forth in the aforesaid co-pending application, Ser. No. 144,639, the disclosure of which is hereby incorporated by reference, may be used to remove the carbobenzoxy protective group.

The reaction is conducted at temperatures of between −10° and +50°C, with temperatures in the neighbourhood of 0°C being preferred. Such low temperatures have a very favorable influence on the aminolysis to hydrolysis ratio, and racemization is substantially avoided. Lower temperatures generally involve difficulties with freezing of the aqueous solvent, depending upon the amount of freezing point-depressing material present in the reaction mixture, and temperatures above +50°C generally involve an undesirably high hydrolysis rate and substantial racemization.

As indicated, the reaction is generally carried out at a pH of between 4 an 12. At a pH value of less than 4, the reaction generally proceeds too slowly to be commerically feasible, and a pH value of greater than 12, hydrolysis of the methyl ester occurs. Preferably, the pH is 7 or more, most preferably in the range of 7 to 9.5.

The concentration of the reactants in the aqueous solvent can vary widely, and is not critical. Generally, however, the reactants will be present in the aqueous solvent in an amount of about 3 to 300 g per liter. The reaction pressure is preferably atmospheric, although higher or lower pressures may be used if desired.

As indicated above, the N-protective group may be removed by acidification. Generally a pH of about 1 is used, although higher or lower pH's may be used, depending upon the particular nature of the protective group. Generally the acidulation will be with a strong mineral acid such as, for instance, hydrochloric, hydrobromic or sulphuric, and may be conveniently conducted at room temperature, although higher or lower temperatures may be used as desired.

Some of the N-protective groups are relatively acid-stable and must be removed by a method other than by acidulation. Such N-protective group removal methods are known to the art, and include hydrogenation, as discussed above in the case of the carbobenzoxy protective group.

In certain instances it will be desired to separate the α- and β-isomer of the aspartyl compounds produced by the present process. This isomer separation can be readily accomplished by crystallization. For instance, when using N-formyl protective compounds, the aqueous reaction mixture can be acidulated to a pH of 1 in order to separate the formyl group from the amino group, and then the crystallization effected by increasing the pH value of the aqueous reaction mixture to about 7. Of course, the crystallization may be accomplished from a polar solvent other than the reaction solvent, if desired, and this other polar solvent may be mixed with water in some instances. For compounds N-protected by a carbobenzoxy group, the α- and β-isomers may be separated directly from the reaction mixture by replacing the aqueous reaction solvent with a water-immiscible organic solvent for the aspartyl compound and then subjecting the resulting solution to extraction with an aqueous sodium carbonate solution. Thereafter, the carbobenzoxy protective group may be removed from the amino group by hydrogenation, as described above.

The α-L-aspertyl-L-amino acid alkyl esters prepared by the process of the present invention can be used as such as sweetening products or they may be processed into polypeptides or into other more complex chemical compounds, or may be incorpoarted in compositions used as sweetening agents.

An example of the use of an α-L-aspartyl-L-amino acid alkyl ester in the preparation of a polypeptide is the synthesis of gastrine. E. Schröder and K. Lübke, 'The Peptides', Vol II, pages 157–160, Academic Press, New York, 1966, the disclosure of which publication is hereby incorporated by reference, described several methods for the preparation of tetragastrine (Trp Met Asp Phe NH$_2$), key material in the preparation of gastrine itself. Tetragastrine can be prepared as follows:

1. Preparation of α-L-aspartyl-L-phenylalanine methyl ester from N-protected L-aspartic acid anhydride and L-phenylalanine methyl ester according to the invention.
2. Protection of the free amino group of Asp Phe OMe by preparing the carbobenzoxy derivative Z Asp Phe OMe. In fact it is possible to use L-N-carbobenzoxy-asparatic acid anhydride as the protected asparatic acid anhydride starting material in step 1, not removing the carbobenzoxy group after the coupling reaction with L-phenylalanine methyl ester. Z Asp Phe OMe is then obtained at once.
3. Reaction of Z Asp Phe OMe with ammonia in the well-known way, resulting in Z Asp phe NH$_2$.
4. Removal of the carbobenzoxy group by reduction with hydrogen and a Pd/C catalyst.
5. Reaction of the resulting Asp Phe NH$_2$ with t-butyloxy carbonyl L-tryptophanyl-L-methionine azide (BOC Trp Met N$_3$) to BOC Trp Met Asp Phe NH$_2$.
6. Removal of the t-butyloxycarbonyl group by the action of trifluoroacetic acid, which results in Trp Met Asp Phe NH$_2$, tetragastrine.

BOC Trp Met N$_3$ can be prepared by the following reaction sequence:

L-t-butyloxycarbonyltryptophane is coupled with L-methionine methyl ester, with dicyclohexylcarbodiimide as coupling agent, to BOC Trp Met OCH$_3$. This product is reacted with hydrazine to BOC Trp Met N$_2$H$_3$. This t-butyloxycarbonyl-L-tryptophanyl-L-methioninehydrazide is reacted with sodium nitrite to BOC Trp Met N$_3$.

The reaction conditions which may be used in the different steps of the above described synthesis of tetragastrine are the usual.

EXAMPLES OF THE INVENTION

The invention will be understood more readily by reference to the following examples; however, these examples are intended to illustrate the invention and are not to be construed to limit the scope of the invention.

EXAMPLE A

Preparation of L-N-formyl-aspartic acid anhydride starting material 175 ml of acetic acid anhydride were slowly added with stirring and moisture exclusion to a solution of 26.6 g of L-aspartic acid (0.2 mole) in 420 ml of formic acid at a temperature of 5°–15°C. After all of the acetic acid anhydride had been added, the reaction mixture was maintained for 3 hours at room temperature and then excess formic acid and acetic acid anhydride were removed by distillation at 50°C and a reduced pressure of 12 mm Hg. 28.8 g of L-N-formyl-aspartic acid anhydride were obtained, corresponding to a yield of 100 percent.

EXAMPLE

L-α-aspartyl-L-phenylalanine methyl ester 7.1 g of L-N-formyl-aspartic acid anhydride (0.05 mole) was added in small portions and with vigorous stirring to a solution of 10.75 g of L-phenylalanine methyl ester. HCl (0.05 mole) in 250 ml of water at a temperature of 0°C and a pH of 9.2. The reaction mixture was maintained at 0°C and a pH of 9.2 for 1 hour until the reaction was terminated by lowering the pH of the reaction mixture to a value of 1 by means of an auto-titration apparatus utilizing concentrated HCl. After standing at room temperature for 48 hours, the mixture was analyzed by thin-layer chromatography and appeared to contain about 85 percent by weight of L-α-aspartyl-L-phenylalanine methyl ester and about 10 percent by weight of L-β-aspartyl-phenylalanine methyl ester.

EXAMPLE 2

L-α-aspartyl-L-phenylalanine methyl ester 7.2 g of N-L-formyl-aspartic acid anhydride (0.05 mole) was added in small portions and with vigorous stirring to a solution of 10.75 g of L-phenylalanine methyl ester. HCl (0.05 mole) in 400 ml of water at a temperature of 0°–1°C and a pH of 7.0. The temperature was maintained at 0°–1°C and the pH of the reaction mixture was maintained at a constant value of 7.0 by means of an auto-titration apparatus utilizing 2 N NaOH. After 15 minutes of reaction time the pH value was increased to 9.0 by addition of NaOH and the aqueous reaction mixture was then extracted with chloroform (4 × 100 ml) to remove unreacted phenylalanine methyl ester (evaporative concentration of this chloroform extract yielded 0.3 g. of phenylalanine methyl ester, corresponding to 3.3 percent by weight of starting ester). The coupling efficiency was 95 percent.

The aqueous reaction mixture was then acidulated to a pH of 2.0 by addition of hydrochloric acid at room temperature, and then extracted with ethyl acetate (6 × 100 ml). The ethyl acetate extracts were dried by contacting the extracts with sodium sulfate to remove water from the extracts, and then the ethyl acetate was distilled at a temperature of 25°C and reduced pressure of 12 mm Hg, leaving a mixture consisting of the α- and β-isomers of L-formyl-aspartyl-L-phenylalanine methyl ester corresponding to a yield of 88 percent. 10 g of this crystalline product were dissolved in a mixture of 100 ml of methanol, 100 ml of water, and 3 ml of concentrated HCl, and the resulting mixture was stirred for 2 hours at a temperature of 45°C and then for 48 hours at room temperature, in order to remove the formyl group from the amino group. The resulting mixture was then passed over a weakly basic acetate form ion exchanger. The material passing through the ion exchanger was concentrated by evaporation at 50°C and a reduced pressure of 12 mm Hg, producing 7.1 g of a mixture of 70 percent of the α- and 30 percent of the β-isomer of L-aspartyl-L-phenylalanine methyl ester.

EXAMPLE 3

L-α-aspartyl-L-phenylalanine methyl ester 7.2 g of N-L-formyl-aspartyl acid anhydride (0.05 mole) was added in small portions and with vigorous stirring to a solution of 10.75 g of L-phenylalanine methyl ester. HCl (0.05 mole) in 400 ml of water at a temperature of 0°C and a pH of 7.0. The pH value was maintained at 7.0 using the procedure of Example 2. After 15 minutes the pH was lowered to a value of 1, and the reaction mixture was maintained at this pH and a temperature of 20°C for 48 hours. Thereafter, the pH was raised to 7 and the reaction mixture was subjected to evaporative concentration at a temperature of 50°C and a pressure of 12 mm Hg until the volume had been reduced to about 200 ml. of 10 g of a mixture of 70 percent of the α- and 30 percent of the β-isomer of L-aspartyl-L-phenylalanine methyl ester was recovered by filtration.

EXAMPLE 4

L-α-aspartyl-L-phenylalanine methyl ester 12.5 g of the L-N-carbobenzoxy-aspartic acid anhydride (0.05 mole) was added in small portions and with vigorous stirring to a solution of 10.75 g of L-phenylalanine methyl ester. HCl (0.05 mole) in 400 ml of water at a temperature of 0°C and a pH of 7.5. The pH of the reaction mixture was maintained at 7.5 during the reaction by the procedure described in Example 2. After 15 minutes of reaction time (subsequent to the last anhydride addition), the pH value was raised to 9.0 and the aqueous solution was extracted with chloroform (4 × 75 ml) in order to remove unconverted L-phenylalanine methyl ester. The pH of the aqueous reaction mixture was then lowered to 1 and the reaction mixture was then extracted with ethyl acetate (4 × 100 ml). The ethyl acetate extract was dried by passage over sodium sulfate and then the ethyl acetate was removed by distillation at 25°C and 12 mm Hg, producing 20 g of a mixture of the α- and β-isomers of L-carbobenzoxy-aspartyl-L-phenylalanine methyl ester, corresponding to a yield of 95 percent.

The 20 g of the solid product obtained above were suspended in 500 ml of methanol and subjected to hydrogenation at a temperature of 25°C using 5 g of a 10 percent by weight of Pd/C catalyst and hydrogen to produce a mixture of the α- and β-isomers of L-aspartyl-L-phenyl-alanine methyl ester. After filtration to remove catalyst, removal of methanol by distillation at a temperature of 40°C and a pressure of 12 mm Hg, and recrystallization of the residue from water, 10.3 g of pure L-α-aspartyl-L-phenylalanine methyl ester were obtained, corresponding to an overall process efficency of 70 percent.

EXAMPLE 5

L-α-aspartyl-L-phenylglycine methyl ester 7.2 g of L-formyl-aspartic acid anhydride (0.05 mole) were added in small portions with vigorous stirring to a solution of 10.05 g of L-phenylglycine methyl ester. HC1 (0.05 mole) in 400 ml of water at a temperature of 0°C and a pH of 7.0. The pH was maintained at 7.0 using the procedure of Example 2. After 15 minutes, the reaction was terminated and the pH value was lowered to 1.0 by the addtion of 10 ml of concentrated HCl. 200 ml of methanol were then added, and the resulting solution was maintained at a temperature of 25°C for 72 hours with stirring, to separate off the N-protective formyl group. The pH of the solution was then raised to 6.0 by the addition of sodium hydroxide and the methanol was removed by distillation at a temperature of 40°C and a pressure of 12 mm Hg. A solid product thereupon crystallized out of solution and was recovered by filtration, yielding 9.9 g of L-α-aspartyl-L-phenylglycine methyl ester.

EXAMPLE 6

L-α-aspartyl-L-phenylalanine methyl ester

Example 5 was repeated, using 10.75 g of L-phenylalanine methyl ester. HCl (0.05 mole) in place of the L-phenylglycine methyl ester. HCl 10.5 g of pure L-α-aspartyl-L-phenylalanine methyl ester were obtained.

What is claimed is:

1. In a process for preparing aspartyl α-amino acid $C_1$-$C_5$ alkyl esters by reacting in an inert solvent reaction medium an N-protected aspartic acid anhydride with an L-α-amino acid $C_1$-$C_5$ alkyl ester, said L-α-amino acid selected from the group consisting of phenylalanine, tyrosine, methoxytyrosine, phenylglycine, hexahydrophenylalanine, hexahydropphenylglycine, aspartic acid and glutamic acid, and thereafter removing the N-protective group from the reaction product to produce the aspartyl amino acid lower alkyl ester having a peptide linkage, the improvement comprising using a solvent reaction medium consisting essentially of water, and conducting said reaction at a temperature of about −10° to about +50°C, and at a pH of about 4 to about 12.

2. Process according to claim 1, wherein the amino acid alkyl ester is in the form of a salt.

3. Process according to claim 2, wherein the said is a hydrochloride salt.

4. Process according to claim 2, wherein a base is added to the reaction mixture in an amount at least the molar equivalent of the amount of amino acid ester salt in said mixture.

5. Process according to claim 1, wherein said amino acid is phenylalanine.

6. Process according to claim 1, wherein said N-protected aspartic acid anhydride is of the formula

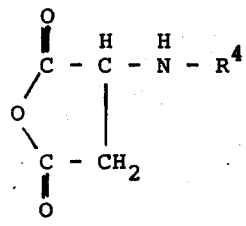

wherein $R^4$ is

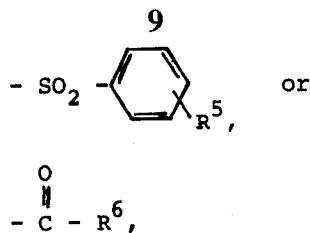

wherein $R^5$ is a lower alkyl radical of 1–4 carbon atoms, wherein 1 or more hydrogen atoms may be substituted by halogen, and $R^6$ is hydrogen, $R^5$, benzhydryl

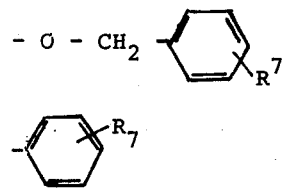

or $OR^5$,
wherein $R^7$ is $R^5$, —$OR^5$, hydrogen, or nitro.

7. Process according to claim 6, wherein said N-protective group is a formyl group.

8. Process according to claim 1, wherein said temperature is about 0°C.

9. Process according to claim 1, wherein said pH is at least about 7.

10. Process according to claim 9, wherein said pH is 7–9.5.

11. Process according to claim 1, wherein said α-amino acid alkylester is a methyl ester.

12. Process according to claim 1, wherein said N-protected aspartic acid anhydride is an L-N-protected aspartic acid anhydride.

13. Process according to claim 1, wherein the amino acid alkyl ester is used in about equimolecular amounts, based on the amount of aspartic acid anhydride.

14. Process according to claim 1, wherein said aspartic acid anhydride is L-N-formyl aspartic acid anhydride, said amino acid alkyl ester is L-phenylalanine methyl ester, said amino acid alkyl ester used in an about equimolecular amount, based on the amount of aspartic acid anhydride.

15. Process according to claim 14 wherein the reaction temperature is about 0°C and the reaction pH is at least about 7.

16. Process according to claim 15 wherein said L-phenylalanine methyl ester is added to the reaction mixture in the form of the hydrochloride salt.

* * * * *